(12) United States Patent
Wang et al.

(10) Patent No.: US 9,838,298 B2
(45) Date of Patent: Dec. 5, 2017

(54) PACKETMIRROR PROCESSING IN A STACKING SYSTEM

(71) Applicant: Hangzhou H3C Technologies Co., Ltd., Hangzhou (CN)

(72) Inventors: Minghui Wang, Beijing (CN); Qingwen Wang, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/892,483

(22) PCT Filed: Jul. 23, 2014

(86) PCT No.: PCT/CN2014/082770
§ 371 (c)(1),
(2) Date: Nov. 19, 2015

(87) PCT Pub. No.: WO2015/010613
PCT Pub. Date: Jan. 29, 2015

(65) Prior Publication Data
US 2016/0134511 A1    May 12, 2016

(30) Foreign Application Priority Data
Jul. 23, 2013    (CN) .......................... 2013 1 0315222

(51) Int. Cl.
*H04L 12/733* (2013.01)
*H04L 12/46* (2006.01)
*H04L 12/721* (2013.01)

(52) U.S. Cl.
CPC ........ *H04L 45/122* (2013.01); *H04L 12/4625* (2013.01); *H04L 45/12* (2013.01)

(58) Field of Classification Search
CPC ....... H04L 45/00; H04L 45/12; H04L 45/122; H04L 12/462; H04L 12/4625; H04L 45/54; H04L 12/46; H04L 45/02
(Continued)

(56) References Cited

U.S. PATENT DOCUMENTS 7,480,258 B1 *  1/2009  Shuen .................... H04L 45/00
                                                    370/217
7,716,330 B2    5/2010  Kulig et al.
(Continued)

FOREIGN PATENT DOCUMENTS

CN    101478434    7/2009
CN    101594304    12/2009
(Continued)

OTHER PUBLICATIONS

CISCO, "Using FabricPath", Cisco Systems, Inc., 2012. http://www.cisco.com/en/US/docs/switches/datacenter/nexus5000/sw/mkt_ops_guides/513_n1_1/n5k_ops_fabricpath.html.
(Continued)

*Primary Examiner* — Michael Thier
*Assistant Examiner* — Rownak Islam
(74) *Attorney, Agent, or Firm* — Hewlett Packard Enterprise Patent Department

(57) ABSTRACT

A CB device receives a first packet sent from another device through a stacking port. In response to determining, based on source port information carried in the first packet, that the first packet entered the stacking system from a PE device and the first packet is a non-unicast packet, the switch module performs mirroring processing to the first packet to obtain a mirrored packet, and transmits the first packet and the mirrored packet to a packet buffering module of the CB device. In response to determining that a second packet from the packet buffering module entered the stacking system
(Continued)

from the PE device and the second packet is the non-unicast packet, the second packet is forbidden from being forwarded through a first-level stacking port of the CB device.

12 Claims, 8 Drawing Sheets

(58) Field of Classification Search
    USPC .................................................. 370/392, 389
    See application file for complete search history.

(56) References Cited

U.S. PATENT DOCUMENTS

| | | | |
|---|---|---|---|
| 8,144,581 | B2 | 3/2012 | Hu |
| 8,305,878 | B1 | 11/2012 | Bishara et al. |
| 2008/0240098 | A1 | 10/2008 | Uttaro et al. |
| 2009/0245137 | A1 | 10/2009 | Hares et al. |
| 2013/0064102 | A1* | 3/2013 | Chang ..................... H04L 49/70 370/244 |
| 2013/0322457 | A1* | 12/2013 | Budhia ................. H04L 49/253 370/401 |
| 2014/0341080 | A1* | 11/2014 | Lin ......................... H04L 45/48 370/256 |

FOREIGN PATENT DOCUMENTS

| | | |
|---|---|---|
| CN | 102075410 A | 5/2011 |
| CN | 102143026 B | 8/2011 |
| CN | 102946356 B | 2/2013 |
| CN | 103220218 | 7/2013 |

OTHER PUBLICATIONS

International Search Report and Written Opinion dated Nov. 15, 2014, PCT Patent Application No. PCT/CN2014/082770 dated Jul. 23, 2014, State Intellectual Property Office of the P.R. China.

* cited by examiner

| when receiving a packet from another device through a stacking port, the switch module may determine, based on source port information carried in the packet, whether the packet enters the stacking system from a PE device or another CB device. In response to determining that the packet enters the stacking system from the other CB device and in case the packet is a non-unicast packet, the switch module may determine whether a first-level stacking port receiving the non-unicast packet is a first-level stacking port on the CB device through which the CB device is connected to the other CB device via a shortest forwarding path. In response to determining that the first-level stacking port receiving the non-unicast packet is the first-level stacking port through which the CB device is connected to the other CB device via the shortest forwarding path, the switch module may transmit the non-unicast packet to the packet buffering module. Otherwise, the switch module may discard the non-unicast packet. When the packet enters the stacking system from the other CB device and in case the packet is a unicast packet, the switch module may transmit the unicast packet to the packet buffering module | S402 |

↓

| when receiving a packet sent from the packet buffering module, the switch module may determine, based on source port information carried in the packet, whether the packet enters the stacking system from a PE device or another CB device. In response to determining that the packet enters the stacking system from the other CB device, the switch module may determine, based on the source port information, a first-level stacking port which is on the CB device and receives the packet. And, the switch module may forbid forwarding the packet through the determined first-level stacking port | S404 |

FIG. 4

PACKETMIRROR PROCESSING IN A STACKING SYSTEM

CLAIM FOR PRIORITY

The present application is a national stage filing under 35 U.S.C 371 of PCT application number PCT/CN2014/082770, having an international filing date Jul. 23, 2014, which claims the benefit of priority from Chinese Patent Application No. 201310315222.8, having a filing date of Jul. 23, 2013, the disclosures of which are hereby incorporated by reference in their entireties.

BACKGROUND

Currently, there are numerous Top of Rack (ToR) access devices in a data center. The deployment of 10-Gigabit servers is a gradual process. It is common to construct a network with a mix of Gigabit servers and 10-Gigabit servers. How to simplify the network structure and management is one issue and some data center technologies aim to achieve functions such as a single management domain, reducing network hierarchies, and flattened management by use of a virtualization access network.

BRIEF DESCRIPTION OF THE DRAWINGS

Features of the present disclosure are illustrated by way of example and not limited in the following figure(s), in which like numerals indicate like elements, in which:

FIG. 4 is a flowchart illustrating a method for forwarding a packet in a stacking system, according to examples of the present disclosure.

DETAILED DESCRIPTION

Hereinafter, the present disclosure will be described in further detail with reference to the accompanying drawings and examples.

In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, and the term "including" means including but not limited to. The term "based on" means based at least in part on. In addition, the terms "a" and "an" are intended to denote at least one of a particular element.

Figure 1:
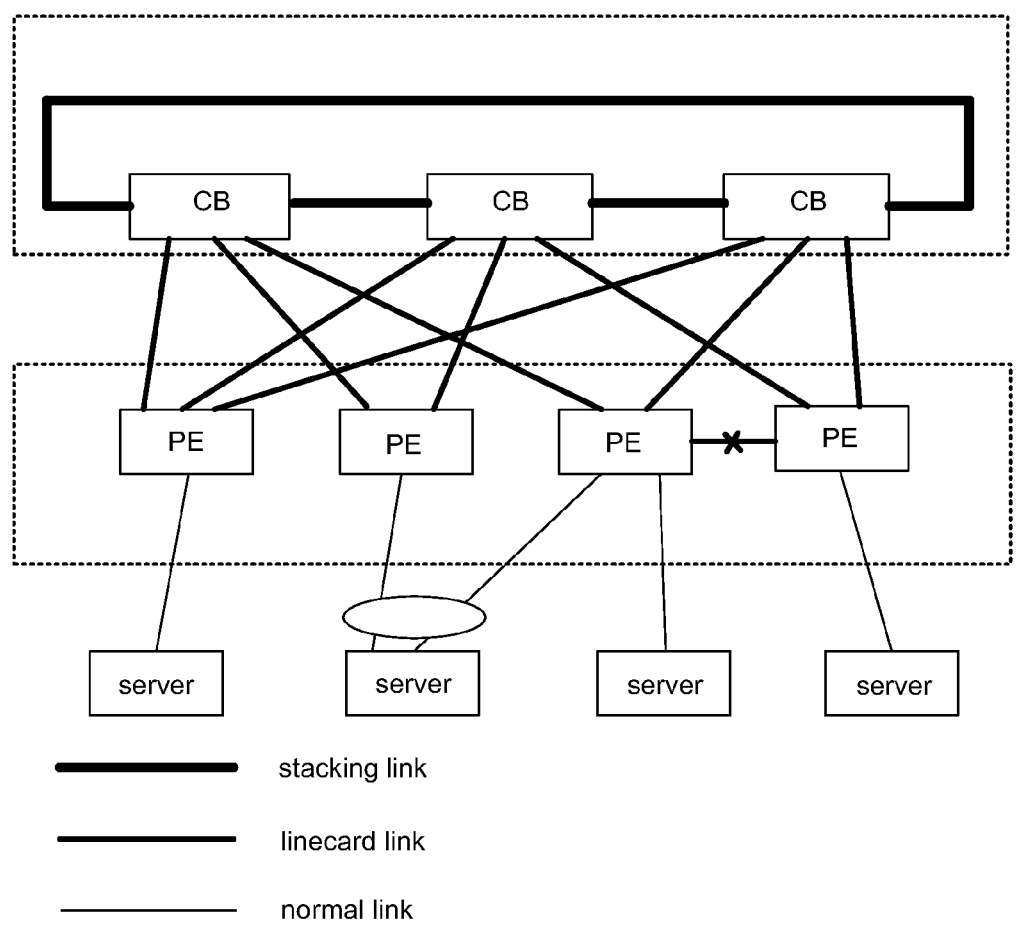
FIG. 1 is a schematic diagram illustrating networking of two-level stacking, according to examples of the present disclosure.

Core Backbone (CB)-Port Extender (PE) networking of two-level stacking is a way for constructing a network in a data center. FIG. 1 is a schematic diagram illustrating a networking model of the two-level stacking system, according to examples of the present disclosure. In the stacking system as shown in FIG. 1, there is a first-level stacking and a second-level stacking. The first-level stacking connects CB devices and may for example use the Intelligent Resilient Framework (IRF) technology. The second-level stacking is a vertical stacking which connects CB devices with PE devices and may for example use the Vertical Intelligent Resilient Framework (VIRF) or Vertical Converged Framework (VCF) technology. In the networking, the second-level stacking may support the first-level stacking, and a direct stacking link may not exist between the PE devices in the second-level stacking. In other words, the PE devices may directly access the first-level stacking formed between the CB devices, and two PE devices may not be directly connected. In FIG. 1, different types of line are used to indicate a "stacking link" between CB devices in the first-level stacking, a "line card link" between PE devices in the second-level stacking and CB devices in the first-level stacking and a "normal link" between a server and a PE device. The "stacking link" and/or the "linecard link" may for example use a HiG format for an internal header of a packet. If a port is configured with a HiG mode, packets sent and/or received through the port may carry the internal header. A link between two ports with the HiG mode may be referred to as a HiG link.

In practice, to achieve non-blocking transmission of a large amount of data in the data center, some CB devices may use a dedicated packet buffering chip to provide a strong data buffering capability. In this case, the packet buffering chip may be called a traffic management (TM) chip. Through a combination of the data buffering capability of the TM chip and a buffering scheduling mechanism, the buffering capability of the CB devices may be effectively used. As such, network congestion and packet loss in the data center caused by a burst service may be reduced.

Figure 2:
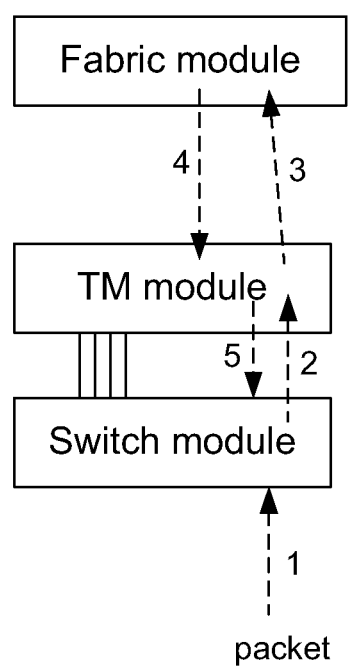
FIG. 2 is a schematic diagram illustrating packet forwarding in a core backbone device having a traffic management chip, according to examples of the present disclosure.

FIG. 2 is a schematic diagram illustrating packet forwarding in a CB device including a switch module, a TM module, and a Fabric module. These modules may be implemented as chips, e.g. FPGA or ASICs arranged to carry out the operations described below or a processing unit to execute machine readable instructions. Among them, the switch module may be connected to the TM module, and the TM module may be connected to the Fabric module. According to examples of the present disclosure, there may be multiple switch modules and multiple TM modules connected to the switch modules. As shown in FIG. 2, the packet forwarding process in the CB device may include following procedures.

At procedure 1, the switch module may receive a packet from the external of the CB device.

At procedure 2, the switch module may check a table, based on a destination address of the packet (which may be a destination media access control (MAC) address or a destination internet protocol (IP) address), to determine whether the packet is a unicast packet or a non-unicast packet. For example, when the packet is a layer-2 packet, a MAC table may be checked. When the packet is a layer-3 packet, a routing table may be checked. When the packet is a Multiprotocol Label Switching (MPLS) packet, a MPLS routing table may be checked. According to examples of the present disclosure, the non-unicast packet may include a broadcast packet, a multicast packet, and a destination address unaware unicast packet. Thereafter, the switch module may not forward the packet in the local, instead, the switch module may transmit the packet to the TM module.

At procedure 3, after performing traffic management to the packet by the switch module, the TM module may transmit the packet to the Fabric module if the packet is a broadcast or multicast packet.

If the packet is a unicast packet and the TM module determines that an egress port of the packet on the CB device is managed by the TM module, the TM module may not transmit the unicast packet to the Fabric module. Instead, the TM module may directly return the unicast packet to the switch module that transmitted the unicast packet to the TM module. On the other hand, if the TM module determines that the egress port of the packet on the CB device is not managed by the TM module, the TM module may transmit the unicast packet to the Fabric module.

At procedure 4, the Fabric module may transmit the packet to a destination TM module connected to a destination switch module. The destination TM module may be a different module to the TM module which received the packet in procedure 2, but is part of the same CB device.

According to examples of the present disclosure, when the packet is a unicast packet, the Fabric module may transmit the packet to one destination TM module. In this case, there is one destination TM module. When the packet is a non-unicast packet, the Fabric module may duplicate the packet and may transmit a duplicated packet to each destination TM module. In this case, there may be a plurality of destination TM modules.

At procedure 5, when receiving the packet transmitted from the Fabric module, the destination TM module may transmit the packet to the destination switch module for forwarding, in which the destination switch module may be directly connected to the destination TM module.

As may be seen from the above description, if the packet received by the switch module is a non-unicast packet, the non-unicast packet may be returned to the switch chip again after being transmitted by the TM module and the Fabric module. At this time, the switch module may not know information about an ingress port through which the non-unicast packet entereds the switch module. As such, the switch module may send the non-unicast packet through the ingress port again. When the ingress port is an external user port (i.e., the ingress port is not a stacking port), an internal header of the non-unicast packet may carry source port information (i.e., the ingress port), so that the switch module may forbid forwarding the non-unicast packet through the ingress port again. When the ingress port is a first-level stacking port between CB devices, as the source port information carried in the non-unicast packet is not the stacking port, the switch module may forward the non-unicast packet through the stacking port, and thus the non-unicast packet may be returned through the ingress port. As such, a serious broadcast loop may appear in the stacking system.

In view of the above, examples of the present disclosure may describe a method for forwarding a packet in a stacking system and a device that may employ the method.

In a CB-PE stacking network, in which a dedicated packet buffering module (which may be a TM chip) may be used in a CB device, a method for standardizing a packet forwarding path may be developed through examples of the present disclosure described later. In the method, a switch module (which may be a switch chip) in a CB device may receive a packet from the external of the CB device through a stacking port. When the packet is a non-unicast packet and the switch module determines, based on source port information carried in the packet, that the packet enters the stacking system from a PE device, the switch module may perform mirroring processing to the non-unicast packet to obtain a mirrored packet, in which the mirroring processing is associated with a first-level stacking port of the CB device. In this case, the operation of preforming the mirroring processing to the packet may be defined to mean to duplicate the packet. The switch module may transmit the non-unicast packet and the mirrored packet to the packet buffering module for traffic management. After receiving a packet sent from the packet buffering module, when the switch module determines, based on source port information carried in the packet, that the packet enters the stacking system from a PE device and in case the packet is a non-unicast packet, the switch module may forbid forwarding the non-unicast packet through all first-level stacking ports of the CB device. By this manner, for a non-unicast packet entering the stacking system from a PE device, the switch chip may be controlled not to forward the non-unicast packet through any first-level stacking port (including a first-level stacking port through which the non-unicast packet enters the CB device, which may also be known as an ingress port), and thus the packet may not be forwarded through the ingress port. As such, a broadcast loop may be avoided. In addition, the non-unicast packet may be mirrored to a neighbor CB device for proxy lookup, and therefore may be forwarded by another CB device, e.g., the neighbor CB device.

A stacking system provided by examples of the present disclosure described later may include a CB device and a PE device connected to the CB device. In this case, two CB devices may be connected through a stacking port which may be called a first-level stacking port. The CB device and the PE device may be connected through a stacking port which may be called a second-level stacking port. The CB device may include a switch module (which may be a switch chip), a packet buffering module (which may be a dedicated TM chip), and a Fabric chip. Among them, the switch module may be directly connected to the packet buffering module, and the packet buffering module may be directly connected to the Fabric chip.

Figure 3:
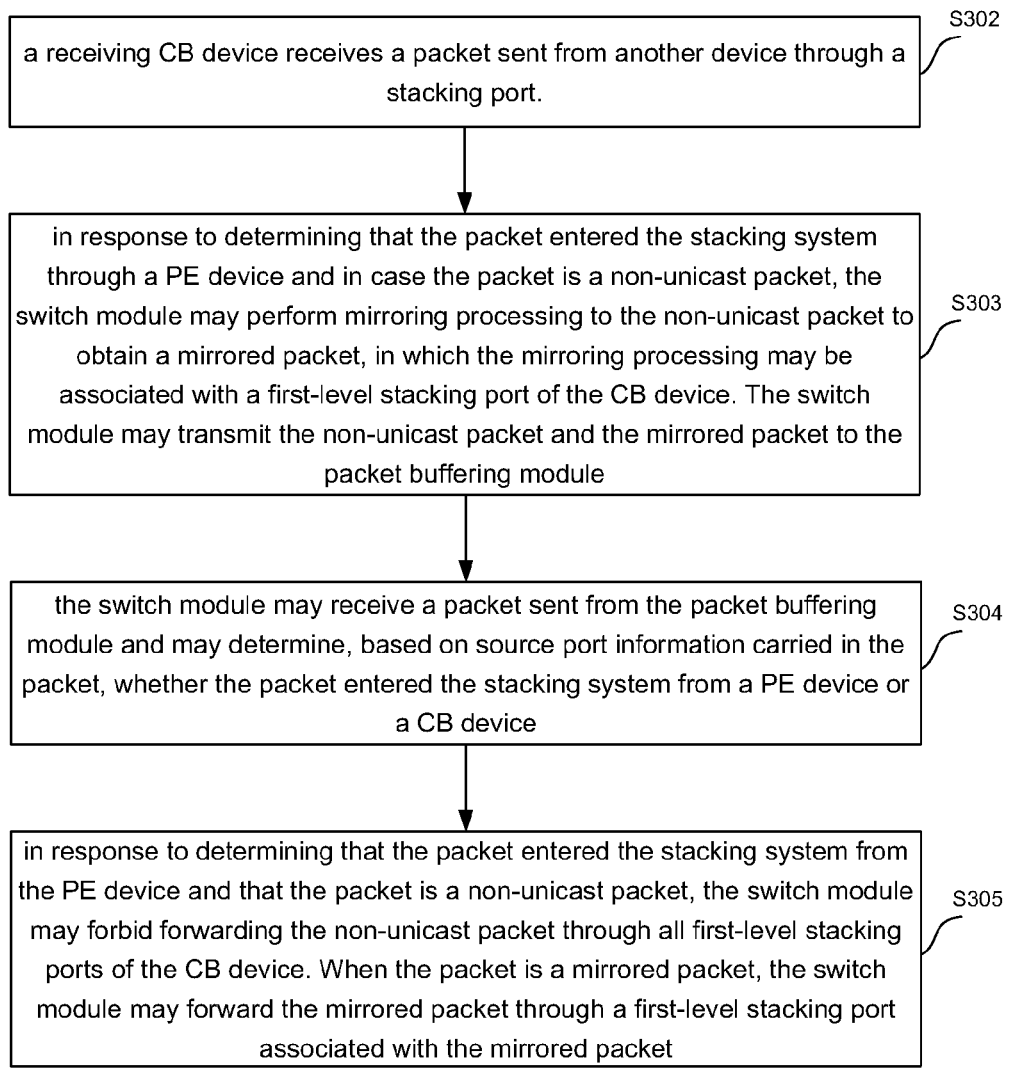
FIG. 3 is a flowchart illustrating a method for forwarding a packet in a stacking system, according to examples of the present disclosure.

The method for forwarding a packet in the stacking system described in examples of the present disclosure may be performed by a switch module in a CB device having a packet buffering module. As shown in FIG. 3, the method may include following operations.

At block S302, a receiving CB device receives a packet sent from another device through a stacking port. The stacking port may for example be a first-level stacking port connecting the CB device to another CB device, or a second-level stacking port connecting the CB device to a PE device. In one example the first-level stacking port may be an Intelligent Resilient Framework (IRF) port and the second-level stacking port may be a Vertical IRF (VIRF) or Vertical Converged Framework (VCF) port.

A switch module of the CB device may determine, based on source port information carried in the packet, whether the packet entered the stacking system through a PE device or a CB device.

At block S303, in response to determining that the packet entered the stacking system through a PE device and in case the packet is a non-unicast packet, the switch module may perform mirroring processing to the non-unicast packet to obtain a mirrored packet, in which the mirroring processing may be associated with a first-level stacking port of the CB device. The switch module may transmit the non-unicast packet and the mirrored packet to the packet buffering module.

The switch module may for example determine whether the packet is a unicast packet or a non-unicast packet by checking a table, for instance as described in block 2 of FIG. 2.

A mirrored packet may for instance be obtained when the mirroring processing is performed to the non-unicast packet for one first-level stacking port. In this case, the number of the mirrored packets may be equal to the number of the first-level stacking ports on the CB device. The switch module may transmit the non-unicast packet and the mirrored packet to the packet buffering module for traffic management. Since the mirrored packet is associated with a first-level stacking port, the mirrored packet may be regarded as a unicast packet in the CB device.

A packet may enter the stacking system through a user port of a PE device, or may enter the stacking system through a user port of a CB device. In this case, the user port may be a port through which the PE device or the CB device is connected to a device outside the stacking system. In other words, the user port may not be a stacking port and may connect a device other than the CB device and the PE device.

When a packet enters the stacking system through a user port of a PE device for the first time, source port information may be included in an internal header of the packet by the PE device. The source port information may include a chip identifier (ID) of a switch chip on the PE device receiving the packet and a port ID of an ingress port of the packet. Thereafter, the source port information of the packet may not be changed during the forwarding process of the packet in the stacking system. As such, when any CB device receives the packet, the CB device may determine through which PE device the packet enters the stacking system based on the source port information of the packet.

According to another example of the present disclosure, when a packet enters the stacking system through a user port of a CB device for the first time, source port information may be included in an internal header of the packet by the CB device. According to examples of the present disclosure, the source port information may include a chip ID of a switch chip on the CB device receiving the packet and a port ID of an ingress port of the packet (which may be a port ID of a port that is on the switch chip of the CB device and receives the packet). Thereafter, the source port information of the packet may not be changed during the forwarding process of the packet in the stacking system. As such, when any CB device receives the packet, the CB device may determine through which CB device the packet enters the stacking system based on the source port information of the packet.

At block S304, the switch module may receive a packet sent from the packet buffering module and may determine, based on source port information carried in the packet, whether the packet entered the stacking system from a PE device or a CB device.

At block S305, in response to determining that the packet entered the stacking system from the PE device and that the packet is a non-unicast packet, the switch module may forbid forwarding the non-unicast packet through all first-level stacking ports of the CB device. When the packet is a mirrored packet, the switch module may forward the mirrored packet through a first-level stacking port associated with the mirrored packet.

According to examples of the present disclosure, an access control list (ACL) rule may be configured at a port on the switch chip connecting the TM chip. Through the ACL rule, a non-unicast packet that enters the stacking system from a PE device may not be forwarded through any first-level stacking port on the CB device where the switch chip is in. In other words, when the CB device receives the non-unicast packet that enters the stacking system from the PE device, the non-unicast packet may not be forwarded through any first-level stacking port on the CB device, instead, the non-unicast packet may be forwarded within the CB device. As such, the non-unicast packet that enters the stacking system from the PE device may just be forwarded within the CB device.

In block S304, as the mirrored packet is associated with a first-level stacking port, so that after receiving the mirrored packet from the packet buffering module, the switch module may forward the mirrored packet to a neighbor CB device through the first-level stacking port associated with the mirrored packet. By this manner, the CB device may mirror a non-unicast packet that enters the stacking system from a PE device to the neighbor CB device for proxy lookup. As such, the non-unicast packet may be forwarded by another CB device, e.g., the neighbor CB device.

A destination of the mirrored packet may be a proxy port at the neighbor CB device, and thus the mirrored packet may be forwarded by the neighbor CB device. The neighbor CB device may perform proxy lookup to a mirrored packet received through a first-level stacking port of the neighbor CB device. In this case, the mirrored packet may be forwarded within the neighbor CB device.

According to examples of the present disclosure, one CB device may include two first-level stacking ports, at most. When a packet is received from one first-level stacking port and a neighbor CB device is connected to the other first-level stacking port, the packet may be mirrored to the neighbor CB device for the other first-level stacking port. As such, in block S302, the non-unicast packet received by the CB device may be a mirrored packet.

In order to perform the mirroring processing to the non-unicast packet for the first-level stacking port of the CB device, the operations in block S302 may be performed according to following situations.

According to examples of the present disclosure, in a first situation, when the non-unicast packet is received through a second-level stacking port, the mirroring processing may be performed to the non-unicast packet for each first-level stacking port of the CB device.

According to examples of the present disclosure, a rule may be configured on the second-level stacking port of the CB device. For example, when the CB device receives a non-unicast packet that enters the stacking system from a PE device, the mirroring processing may be performed to the non-unicast packet for each first-level stacking port of the CB device. In this way, the non-unicast packet sent from the PE device may be mirrored to a neighbor CB device.

In this case, when the CB device has two neighbor CB devices, i.e., the CB device has two first-level stacking ports, the non-unicast packet may be mirrored for each first-level stacking port. As such, two mirrored packets may be obtained. In other words, the non-unicast packet may be mirrored to the two neighbor CB device, respectively. As the mirrored packet may be regarded as a unicast packet within the CB device, the mirrored packet may be forwarded to the neighbor CB device through the first-level stacking port.

According to examples of the present disclosure, in a second situation, when the non-unicast packet is received through a first-level stacking port, the mirroring processing may be performed to the non-unicast packet for other first-level stacking port of the CB device.

According to examples of the present disclosure, a rule may be configured on the first-level stacking port of the CB device. For example, when the CB device receives a non-unicast packet that enters the stacking system from a PE device, the mirroring processing may be performed to the non-unicast packet for a first-level stacking port of the CB device other than the first-level stacking port receiving the non-unicast packet. Alternatively, according to another example of the present disclosure, it may be forbidden to perform the mirroring processing to the non-unicast packet for the first-level stacking port receiving the non-unicast packet. By this manner, a mirrored packet mirrored from a neighbor CB device (after checking a table, the mirrored packet may be determined as a non-unicast packet) may be mirrored to another neighbor CB device.

According to examples of the present disclosure, a non-unicast packet that enters the stacking system from a PE device may be blocked at a stacking link between two CB devices, which may prevent a forwarding loop of the mirrored packet, i.e., prevent the mirrored packets from forming a storm. For example, three CB devices including CB1, CB2, and CB3 form a ring stacking CB1-CB2-CB3-CB1. In this case, when CB1 receives a mirrored packet from CB2 through a first-level stacking port, CB1 may perform the mirroring processing to the mirrored packet for another first-level stacking port of CB1 and may send the mirrored packet to CB3 through the other first-level stacking port of CB1. When CB3 receives the mirrored packet from CB2 through a first-level stacking port, CB3 may perform the mirroring processing to the mirrored packet for another first-level stacking port of CB3 and may send the mirrored packet to CB1 through the other first-level stacking port of CB3. As such, a forwarding loop of the mirrored packet may be formed. Therefore, in order to prevent the forwarding loop of the mirrored packet, the non-unicast packet that enters the stacking system from a PE device may be blocked at a stacking link between two CB devices.

As may be seen from the above description, under the two situations in block S302, when the mirroring processing is performed to the non-unicast packet for a first-level stacking port of the CB device and the non-unicast packet is blocked at a stacking link between the CB device and a neighbor CB device connected to the CB device through the first-level stacking port, it may be forbidden to perform the mirroring processing to the non-unicast packet for the first-level stacking port.

According to examples of the present disclosure, non-unicast packets that enter the stacking system from different PE devices may be blocked at different stacking links between CB devices. As such, load balance may be achieved.

The examples described above may provide procedures for forwarding a packet that enters the stacking system from a PE device.

According to examples of the present disclosure, the method for forwarding a packet in a stacking system may be performed by a switch module in a CB device having a packet buffering module. As shown in FIG. 4, the method may include following operations.

In block S402, when receiving a packet from another device through a stacking port, the switch module may determine, based on source port information carried in the packet, whether the packet enters the stacking system from a PE device or another CB device. In response to determining that the packet enters the stacking system from the other CB device and in case the packet is a non-unicast packet, the switch module may determine whether a first-level stacking port receiving the non-unicast packet is a first-level stacking port on the CB device through which the CB device is connected to the other CB device via a shortest forwarding path. In response to determining that the first-level stacking port receiving the non-unicast packet is the first-level stacking port through which the CB device is connected to the other CB device via the shortest forwarding path, the switch module may transmit the non-unicast packet to the packet buffering module. Otherwise, the switch module may discard the non-unicast packet. When the packet enters the stacking system from the other CB device and in case the packet is a unicast packet, the switch module may transmit the unicast packet to the packet buffering module.

According to examples of the present disclosure, when receiving a packet from the external of the CB device, the switch module may determine, based on the source port information carried in the packet, whether the packet enters the stacking system from a PE device or a CB device. In addition, the switch module may determine whether the packet is a unicast packet or a non-unicast packet through checking a table (operations of checking the table may refer to the aforementioned procedure 2 in FIG. 2, which are not repeated herein). In response to determining that the packet enters the stacking system from a CB device, the switch module may transmit the packet to the packet buffering module for traffic management regardless of whether the packet is a unicast packet or a non-unicast packet.

According to examples of the present disclosure, a packet may enter the stacking system through a user port of a PE device, or may enter the stacking system through a user port of a CB device. In this case, the user port may be a port through which the PE device or the CB device is connected to a device outside the stacking system. In other words, the user port may not be a stacking port and may connect a device other than a CB device and a PE device.

According to examples of the present disclosure, when a CB device receives a packet through a user port of the CB device, the CB device may forward the packet based on a process including following procedures 21-25.

At procedure 21, a switch chip 1 of the CB device may receive a packet from another device through a user port 1.

At procedure 22, based on a destination address of the packet, the switch chip 1 may check a table (operations of checking the table may refer to the aforementioned procedure 2 in FIG. 2, which are not repeated herein) to determine whether the packet is a unicast packet or a non-unicast packet and to search out a chip ID of a destination switch chip on a destination CB device and a port ID of a destination port on the destination CB device, in which the packet may be forwarded to the destination CB device. The switch chip 1 may transmit the packet to a TM chip of the CB device, in which an internal header of the packet may carry ingress port information, a unicast/non-unicast identifier, and egress port information. In this case, the ingress port information may include a chip ID of the switch chip 1 and a port ID of the user port 1. The unicast/non-unicast identifier may be defined to indicate whether the packet is a unicast packet or a non-unicast packet. The egress port information may include the chip ID of the destination switch chip on the destination CB device and the port ID of the destination port on the destination CB device.

For example, the switch chip 1 may search, based on a destination MAC address of the packet, a MAC address table for a matched entry. When the matched entry is searched out, the packet may be determined as a unicast packet. In this case, the matched entry may include the chip ID of the destination switch chip on the destination CB device and the port ID of the destination port on the destination CB device. The switch chip 1 may search, based on the chip ID of the destination switch chip on the destination CB device, a unicast mapping table to determine that an egress port of the packet on the switch chip 1 may be a port on the switch chip 1 connecting the TM chip, and the switch chip 1 may forward the packet to the TM chip through the port.

When the switch chip 1 does not search out the matched entry in the MAC address table based on the destination MAC address of the packet, it may be determined that the packet is a non-unicast packet. In this case, the switch chip 1 may search, based on a virtual local area network (VLAN) ID carried in the non-unicast packet, a VLAN broadcasting table to determine that an egress port of the non-unicast packet on the switch chip 1 may be a port on the switch chip 1 connecting the TM chip, and the switch chip 1 may forward the non-unicast packet to the TM chip through the port.

At procedure 23, the TM chip may perform traffic management to the packet, and may transmit the packet to a Fabric chip.

According to examples of the present disclosure, the packet may be a unicast packet. When the TM chip determines, based on the egress port information carried in the internal header of the unicast packet, that an egress port of the unicast packet on the CB device is managed by the TM chip, the TM chip may not transmit the unicast packet to the Fabric chip, instead, the TM chip may directly return the unicast packet to the switch chip 1 for forwarding. When the TM chip determines that the egress port of the unicast packet on the CB device is not managed by the TM chip, the TM chip may transmit the unicast packet to the Fabric chip.

At procedure 24, the Fabric chip may transmit the packet to a destination TM chip to which a destination switch chip on the CB device may be connected.

According to examples of the present disclosure, when the packet is a unicast packet, the Fabric chip may transmit the unicast packet to a single destination TM chip. In this case, there is one destination TM chip. According to another example of the present disclosure, when the packet is a non-unicast packet, the Fabric chip may duplicate the packet and transmit the duplicated packet to each destination TM chip. In this case, there are a plurality of destination TM chips.

At procedure 25, when receiving the packet transmitted from the Fabric chip, the destination TM chip may transmit the packet to the destination switch chip on the CB device for forwarding, in which the destination switch chip may be directly connected to the destination TM chip.

According to examples of the present disclosure, when the packet is a unicast packet, the destination switch chip on the CB device may search out, in the unicast mapping table and based on the egress port information in the internal header of the packet, an egress port of the unicast packet on the destination switch chip of the CB device, and may forward the unicast packet through the egress port. In this case, the egress port information may include the chip ID of the destination switch chip on the destination CB device, and the egress port may be a first-level stacking port on the CB device through which the CB device is connected to the destination CB device via a shortest forwarding path.

According to examples of the present disclosure, when the packet is a non-unicast packet, the destination switch chip on the CB device may search out, in the VLAN broadcasting table and based on the VLAN ID carried in the non-unicast packet, an egress port of the non-unicast packet on the destination switch chip of the CB device, and may forward the non-unicast packet through the egress port. In this case, the egress port may be at least one of a first-level stacking port, a second-level stacking port, and a user port that are in a VLAN indicated by the VLAN ID.

As may be seen from the above descriptions about procedures 21-25, a CB device may transmit a unicast packet received from a user port to a destination CB device through a shortest forwarding path, and may broadcast a non-unicast packet received from the user port within a corresponding VLAN.

In block S404, when receiving a packet sent from the packet buffering module, the switch module may determine, based on source port information carried in the packet, whether the packet enters the stacking system from a PE device or another CB device. In response to determining that the packet enters the stacking system from the other CB device, the switch module may determine, based on the source port information, a first-level stacking port which is on the CB device and receives the packet. And, the switch module may forbid forwarding the packet through the determined first-level stacking port.

According to examples of the present disclosure, in block S404, the first-level stacking port receiving the packet may be a first-level stacking port on the CB device through which the CB device is connected to the other CB device via the shortest forwarding path. In addition, in blocks S402 and S404, when there are at least two equivalent forwarding paths between the CB device and the other CB device, the shortest forwarding path may be selected from the at least two equivalent forwarding paths according to a predetermined path-selection rule.

According to examples of the present disclosure, the predetermined path-selection rule may be implemented as follows. When there are at least two equivalent forwarding paths between a source CB device and a destination CB device, a forwarding path with minimum hops may be selected from the at least two equivalent forwarding paths as the shortest forwarding path. According to examples of the present disclosure, the at least two equivalent forwarding paths may have the same number of hops. In this case, when a device identifier of the source CB device is smaller than a device identifier of the destination CB device, the packet may be forwarded through a first first-level stacking port. When the device identifier of the source CB device is greater than the device identifier of the destination CB device, the packet may be forwarded through a second first-level stacking port. For example, two first-level stacking ports of a CB device may be denoted as a first-level stacking port 1 and a first-level stacking port 2, respectively. According to examples, the first-level stacking port 1 may be configured as the first first-level stacking port and the first-level stacking port 2 may be configured as the second first-level stacking port. Alternatively, according to another example, the first-level stacking port 2 may be configured as the first first-level stacking port and the first-level stacking port 1 may be configured as the second first-level stacking port. Examples of the present disclosure may not specifically limit herein.

According to examples of the present disclosure, an ACL rule may be configured at a port on the switch module through which the switch module is connected to the packet buffering module. Through the ACL rule, a packet that enters the stacking system from another CB device and is received through a first-level stacking port of the CB device may not be forwarded through the first-level stacking port receiving the packet.

According to examples of the present disclosure, in block S404, when receiving a packet sent from the TM chip (i.e., the packet buffering module), the switch chip may determine, according to the source port information carried in the packet, a CB device through which the packet enters the stacking system. For example, the switch chip may determine that the packet enters the stacking system from another CB device (to facilitate the description, the other CB device may be referred to as CB1). During topology calculation, a shortest forwarding path between the CB device and the other CB device may be calculated, i.e., a first-level stacking port on the CB device through which the CB device is connected to the other CB device via the shortest forwarding path may be calculated. As such, in response to determining that the packet enters the stacking system from CB1, a first-level stacking port on the switch chip receiving the packet may be determined, i.e., an ingress port of the packet may be determined. The determined first-level stacking port (to facilitate the description, the determined first-level stacking port may be referred to as PORT1) may be a first-level stacking port on the CB device through which the CB device is connected to CB1. Then, the switch chip may remove PORT1 from ports that may forward the packet, so as to forbid forwarding the packet through PORT1.

The packet in the examples described above may be either a unicast packet or a non-unicast packet. That is, for a packet that enters the stacking system from a user port of a CB device, when another CB device receives the packet through a first-level stacking port between CB devices, the other CB device may not forward the packet through an ingress port of the packet regardless of whether the packet is a unicast packet or a non-unicast packet, in which the ingress port may be the first-level stacking port on the other CB device receiving the packet. As such, a broadcasting loop may be avoided.

The examples described above may provide procedures for forwarding a packet that enters the stacking system from a CB device.

As may be seen from the above description, in a CB-PE stacking network in which a dedicated packet buffering module (e.g., a TM chip) may be used in a CB device, a switch module (e.g., a switch chip) in the CB device may receive a packet through a stacking port. When the switch module determines, based on source port information carried in the packet, that the packet enters the stacking system from another CB device and in cased the packet is a non-unicast packet, the switch module may determine whether a first-level stacking port receiving the packet is a first-level stacking port on the CB device through which the CB device is connected to the other CB device via a shortest forwarding path. In response to determining that the first-level stacking port receiving the packet is the first-level stacking port through which the CB device is connected to the other CB device via the shortest forwarding path, the switch module may transmit the non-unicast packet to the packet buffering module for traffic management, otherwise, the switch module may discard the non-unicast packet. When the switch module determines, based on the source port information carried in the packet, that the packet enters the stacking system from another CB device and in cased the packet is a unicast packet, the switch module may transmit the unicast packet to the packet buffering module for traffic management. When the switch module receives a packet sent from the packet buffering module and determines, based on source port information carried in the packet, that the packet enters the stacking system through a user port of another CB device, the switch module may determine a first-level stacking port that receives the packet, and may forbid forwarding the packet through the determined first-level stacking port. As such, for the packet that enters the stacking system through the user port of the other CB device, the switch chip may be controlled not to forward the packet through the first-level stacking port receiving the packet, regardless of whether the packet is a unicast packet or a non-unicast packet. In this way, the packet may not be forwarded through an ingress port, and thus a broadcasting loop may be avoided.

In the above examples, the procedures for forwarding a packet that enters the stacking system through a PE device and the procedures for forwarding a packet that enters the stacking system through a CB device may be implemented either together or independently, which may not be limited by examples of the present disclosure.

Figure 5:
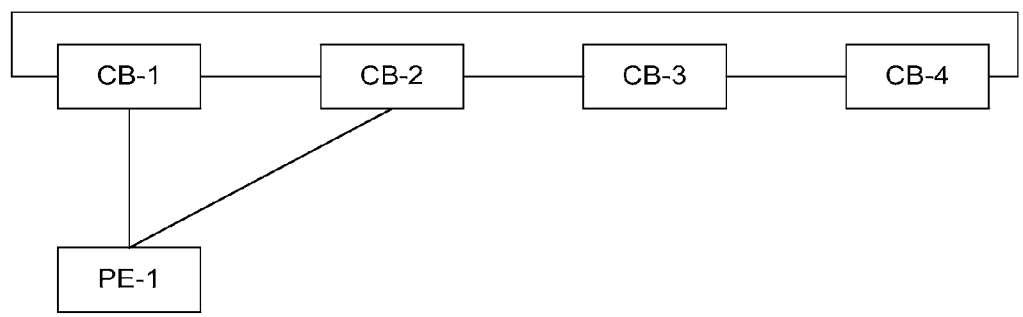
FIG. 5 is a schematic diagram illustrating a structure of a stacking system, according to examples of the present disclosure.

Hereinafter, the methods provided by the above examples may be described taking a stacking system as shown in FIG. 5. As shown in FIG. 5, CB devices including CB-1, CB-2, CB-3, and CB-4 may be connected with each other through first-level stacking ports. PE-1, which is a PE device, may be connected to CB-1 and CB-2 through second-level stacking ports.

Taking CB-2 as an example, procedures for processing, by a switch chip in CB-2, a packet that enters the stacking system from CB-1 may include following operations.

At procedure S501, the switch chip may receive the packet through a first-level stacking port (which may be denoted as PORT1) on CB-2 through which CB-2 is connected to CB-1.

In this case, source port information carried in an internal header of the packet may include a chip ID of a switch chip (which may be denoted as switch chip 1) in CB-1 and a port ID of a port (which may be denoted PORT2) on switch chip 1 that receives the packet.

At procedure S502, the switch chip may determine whether the packet is a unicast packet or a non-unicast packet through checking a table (operations of checking the table may refer to the aforementioned procedure 2 in FIG. 2, which are not repeated herein). The switch chip may further determine, based on source port information carried in the packet, whether the packet enters the stacking system from a PE device or a CB device. In response to determining that the packet is a non-unicast packet and the non-unicast packet enters the stacking system through a user port of CB-1, the switch chip may determine whether the first-level stacking port PORT1 receiving the non-unicast packet is a first-level stacking port through which CB-2 is connected to CB-1 via a shortest forwarding path, i.e., the switch chip may determine whether PORT1 is a first-level stacking port through which CB-2 is directly connected to CB-1. In response to determining that PORT1 is the first-level stacking port through which CB-2 is connected to CB-1 via the shortest forwarding path, the switch chip may transmit the non-unicast packet to a TM chip for traffic management. In response to determining that the packet is a unicast packet and the unicast packet enters the stacking system through the user port of CB-1, the switch chip may transmit the unicast packet to the TM chip for traffic management.

Processing procedures of a Fabric chip and the TM chip may not be repeated herein.

At procedure S503, when the switch chip receives a packet sent from the TM chip and determines, based on source port information carried in the packet, that the packet enters the stacking system through the user port of CB-1, the switch chip may determine that a first-level stacking port through which CB-2 is connected to CB-1 via the shortest forwarding path is PORT1. The switch chip may remove PORT1 from ports that may forward the packet, so as to forbid forwarding the packet through PORT1.

As shown in FIG. 5, both of CB-1 and CB-2 are connected to PE-1, therefore, according to examples of the present disclosure, CB-2 may receive, through a second-level stacking port through which CB-2 is connected to PE-1, a non-unicast packet that enters the stacking system from PE-1. Alternatively, according to another example of the present disclosure, CB-2 may receive, through a first-level stacking port through which CB-2 is connected to CB-1, a non-unicast packet that enters the stacking system from PE-1. As such, there may be two ways for the switch chip in CB-2 to process the packet that enters the stacking system from PE-1.

In a first way, the switch chip may receive the packet through the second-level stacking port.

At procedure S601-1, when receiving the packet through the second-level stacking port, the switch chip may determine whether the packet is a unicast packet or a non-unicast packet through checking a table (operations of checking the table may refer to the aforementioned procedure 2 in FIG. 2, which are not repeated herein). In response to determining that the packet is a unicast packet, the unicast packet may be processed in accordance with the prior art. In response to determining that the packet is a non-unicast packet, operations in procedure S602-1 may be performed.

At procedure S602-1, in response to determining, based on source port information carried in the non-unicast packet, that the packet enters the stacking system through a user port of PE-1, the switch chip may transmit the non-unicast packet to the TM chip. At the same time, as the non-unicast packet is received from the second-level stacking port through which CB-2 is connected to PE-1, the switch chip may perform mirroring processing to the non-unicast packet, for two first-level stacking ports of CB-2, to obtain two mirrored packets, in which CB-2 is connected to CB-1 and CB-3 through the two first-level stacking ports, respectively. The switch chip may transmit the two mirrored packets to the TM chip.

At procedure S603-1, when the switch chip receives a non-unicast packet sent from the TM chip and determines, based on source port information carried in the non-unicast packet, that the non-unicast packet enters the stacking system through the user port of PE-1, the switch chip may remove the first-level stacking ports through which CB-2 is connected to CB-1 and CB-3 from ports that may forward the non-unicast packet, so as to forbid forwarding the non-unicast packet via the first-level stacking ports through which CB-2 is connected to CB-1 and CB-3.

At procedure S604-1, when receiving a mirrored packet sent from the TM chip, the switch chip may forward the mirrored packet through a first-level stacking port associated with the mirrored packet. In the present example, the mirrored packet may be forwarded to CB-1 and CB-3.

In a second way, the switch chip may receive the packet through the first-level stacking port.

At procedure S601-2, when receiving the packet via the first-level stacking port through which CB-2 is connected to CB-1, the switch chip may determine whether the packet is a unicast packet or a non-unicast packet by means of checking a table (operations of checking the table may refer to the aforementioned procedure 2 in FIG. 2, which are not repeated herein). In response to determining that the packet is a unicast packet, the unicast packet may be processed in accordance with the prior art. In response to determining that the packet is a non-unicast packet, operations at procedure S602-2 may be performed.

At procedure S602-2, in response to determining, based on source port information carried in the non-unicast packet, that the non-unicast packet enters the stacking system from the user port of PE-1, the switch chip may transmit the non-unicast packet to the TM chip. At the same time, as the non-unicast packet is received from the first-level stacking port through which CB-2 is connected to CB-1, the switch chip may perform the mirroring processing to the non-unicast packet, for a first-level stacking port through which CB-2 is connected to CB-3, to obtain a mirrored packet. The switch chip may transmit the mirrored packet to the TM chip.

At procedure S603-2, when the switch chip receives a non-unicast packet sent from the TM chip and determines, based on source port information carried in the non-unicast packet, that the non-unicast packet enters the stacking system through the user port of PE-1, the switch chip may remove the first-level stacking ports through which CB-2 is connected to CB-1 and CB-3 from ports that may forward the non-unicast packet, so as to forbid forwarding the non-unicast packet via the first-level stacking ports through which CB-2 is connected to CB-1 and CB-3.

At procedure S604-2, when receiving a mirrored packet sent from the TM chip, the switch chip may forward the mirrored packet through a first-level stacking port associated with the mirrored packet. In the present example, the mirrored packet may be forwarded to CB-3.

According to another example of the present disclosure, it may be assumed that the non-unicast packet that enters the stacking system from PE-1 may be blocked at a stacking link between CB-1 and CB-4. Taking CB-4 as an example, a switch chip in CB-4 may process a packet that enters the stacking system from PE-1 in a following way.

At procedure S701, when receiving a packet via a first-level stacking port through which CB-4 is connected to CB-3, the switch chip may determine whether the packet is a unicast packet or a non-unicast packet by means of checking a table (operations of checking the table may refer to the aforementioned procedure 2 in FIG. 2, which are not repeated herein). In response to determining that the packet is a unicast packet, the unicast packet may be processed in accordance with the prior art. In response to determining that the packet is a non-unicast packet, operations at procedure S702 may be performed. In this case, the non-unicast packet received by the switch chip of CB-4 may be mirrored from CB-3.

At procedure S702, in response to determining, based on source port information carried in the non-unicast packet, that the non-unicast packet enters the stacking system through a user port of PE-1, the switch chip may transmit the non-unicast packet to a TM chip. At the same time, a local rule may be configured on CB-4, in which the rule may include blocking the non-unicast packet that enters the stacking system from PE-1 at a stacking link between CB-4 and CB-1, in which the non-unicast packet is received through the first-level stacking port on CB-4 connecting CB-4 with CB-3. As such, CB-4 may not mirror the non-unicast packet for first-level stacking ports connecting CB-3 and CB-1. By this manner, CB-4 may not continue to mirror the non-unicast packet entering the stacking system through PE-1 to CB-1. In other words, the packet may be blocked at the stacking link between CB-4 and CB-1.

At procedure S703, when the switch chip receives a non-unicast packet sent from the TM chip and determines, based on source port information carried in the non-unicast packet, that the non-unicast packet enters the stacking system through the user port of PE-1, the switch chip may remove the first-level stacking ports on CB-4 through which CB-4 is connected to CB-1 and CB-3 from ports that may forward the non-unicast packet, so as to forbid forwarding the non-unicast packet via the first-level stacking ports on CB-4 through which CB-4 is connected to CB-1 and CB-3.

Based on the above descriptions, examples of the present disclosure may provide a switch module 10. The switch module 10 may be applied to a CB device with a packet buffering module 20 (such as a TM chip). The CB device may be used in a stacking system comprising a plurality of CB devices and PE devices.

Figure 6A:
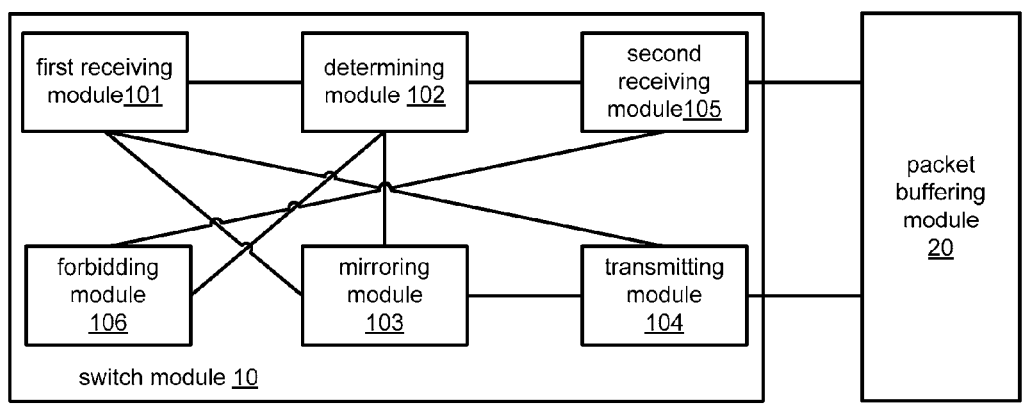
FIG. 6A is a schematic diagram illustrating a structure of a switch module, according to examples of the present disclosure.

As shown in FIG. 6A, the switch module 10 of the CB device may include a first receiving module 101, a determining module 102, a mirroring module 103, a transmitting module 104, a second receiving module 105, and a forbidding module 106. These modules may be implemented as machine readable instructions executable by a processor and/or as hardware logic circuitry of an ASIC or FPGA etc.

The first receiving module 101 may receive a packet sent from another device through a stacking port.

When the first receiving module 101 receives the packet sent from the other device, the determining module 102 may determine, based on source port information carried in the packet, whether the packet enters the stacking system from a PE device or a CB device. When the second receiving module 105 receives a packet sent from the packet buffering module 20, the determining module 102 may determine, based on source port information carried in the packet, whether the packet enters the stacking system from a PE device or a CB device.

When the determining module 102 determines that the packet sent from the other device and received by the first receiving module 101 enters the stacking system from the PE device and in case the packet is a non-unicast packet, the mirroring module 103 may perform mirroring processing to the non-unicast packet to obtain a mirrored packet, in which the mirroring processing is associated with a first-level stacking port of the CB device.

The transmitting module 104 may transmit the non-unicast packet and the mirrored packet obtained by the mirroring module 103 to the packet buffering module 20.

The second receiving module 105 may receive a packet sent from the packet buffering module 20.

When the determining module 102 determines that the packet sent from the packet buffering module 20 and received by the second receiving module 105 enters the stacking system from a PE device and in case the packet is a non-unicast packet, the forbidding module 106 may forbid forwarding the non-unicast packet through all first-level stacking ports of the CB device.

Figure 6B:
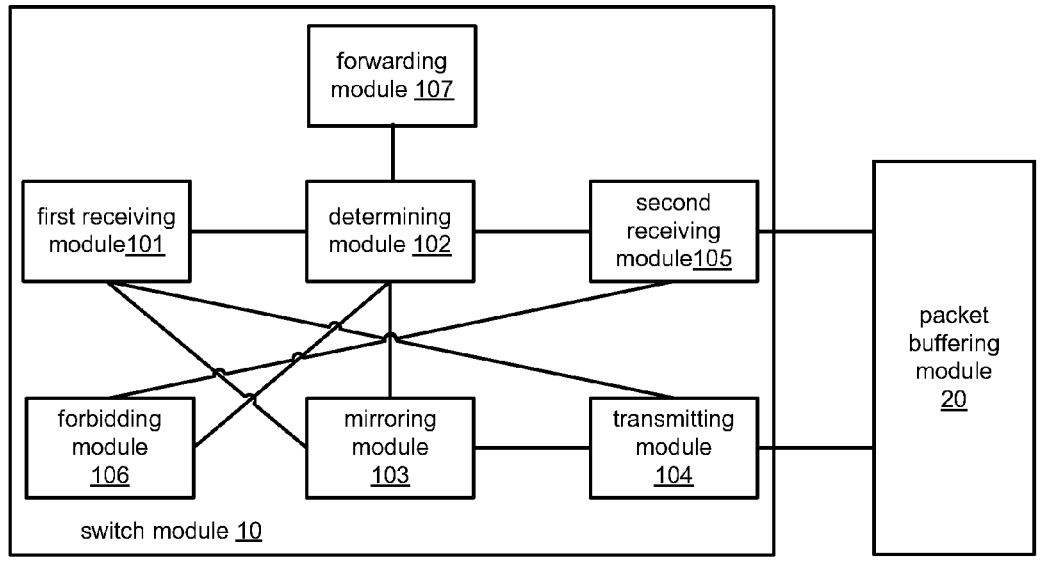
FIG. 6B is a schematic diagram illustrating a structure of a switch module, according to examples of the present disclosure.

According to examples of the present disclosure, the switch module 10 may further include a forwarding module 107, as shown in FIG. 6B. When the determining module 102 determines that the packet sent from the packet buffering module 20 enters the stacking system from the PE device and in case the packet is a mirrored packet, the forwarding module 107 may forward the mirrored packet through a first-level stacking port associated with the mirrored packet.

According to examples of the present disclosure, the mirroring module 103 may perform the mirroring processing to the non-unicast packet for the first-level stacking port of the CB device according to a following way. When the non-unicast packet is received through a second-level stacking port, the mirroring module 103 may perform the mirroring processing to the non-unicast packet for each first-level stacking port of the CB device. When the non-unicast packet is received through a first-level stacking port of the CB device, the mirroring module 103 may perform the mirroring processing to the non-unicast packet for another first-level stacking port of the CB device. According to examples of the present disclosure, when the mirroring processing is performed to the non-unicast packet for a first-level stacking port and the non-unicast packet is blocked at a stacking link between a neighbor CB device and the CB device connected to the neighbor CB device through the first-level stacking port, the mirroring module 103 may forbid performing the mirroring processing to the non-unicast packet for the first-level stacking port.

According to examples of the present disclosure, non-unicast packets that enter the stacking system from different PE devices may be blocked at different stacking links. As such, load balance may be achieved.

Figure 6C:
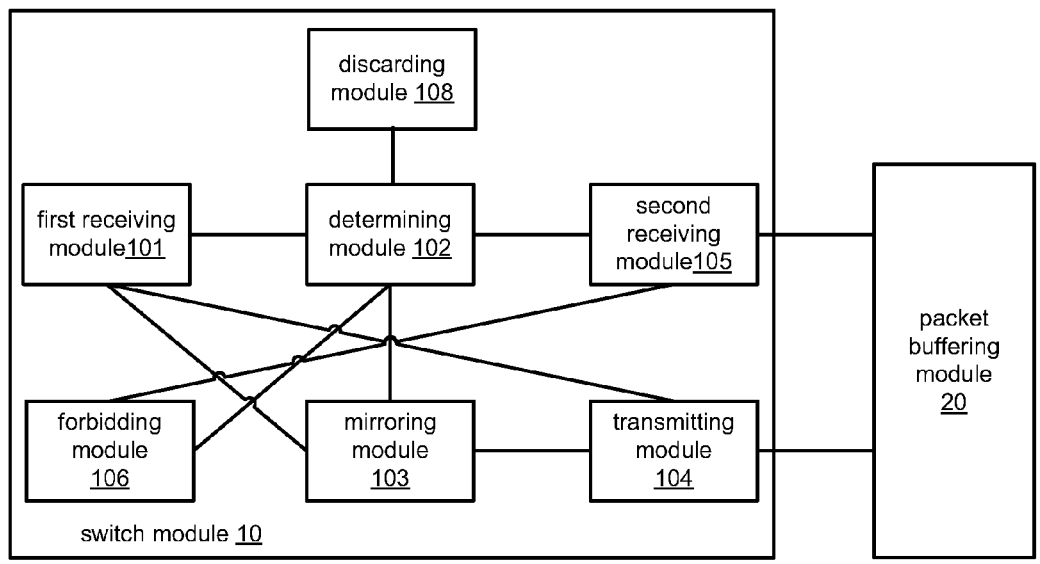
FIG. 6C is a schematic diagram illustrating a structure of a switch module, according to examples of the present disclosure.

According to examples of the present disclosure, the switch module 10 may further include a discarding module 108, as shown in FIG. 6C.

When the determining module 102 determines that the packet sent from the other device and received by the first receiving module 101 enters the stacking system from another CB device and in case the packet is a non-unicast packet, the determining module 102 may determine whether a first-level stacking port receiving the non-unicast packet is a first-level stacking port on the CB device through which the CB device is connected to the other CB device via a shortest forwarding path.

When the determining module 102 determines that the first-level stacking port receiving the non-unicast packet is the first-level stacking port through which the CB device is connected to the other CB device via the shortest forwarding path, the transmitting module 104 may transmit the non-unicast packet to the packet buffering module 20. When the determining module 102 determines that the packet sent from the other device and received by the first receiving module 101 enters the stacking system from the other CB device and in case the packet is a unicast packet, the transmitting module 104 may transmit the unicast packet to the packet buffering module 20.

When the determining module 102 determines that the first-level stacking port receiving the non-unicast packet is not the first-level stacking port through which the CB device is connected to the other CB device via the shortest forwarding path, the discarding module 108 may discard the non-unicast packet.

When the determining module 102 determines that the packet received by the second receiving module 105 and sent from the packet buffering module 20 enters the stacking system form the other CB device, the forbidding module 106 may determine, based on source port information of the packet, a first-level stacking port on the CB device that receives the packet, and forbid forwarding the packet through the determined first-level stacking port.

The above-mentioned modules in the examples of the present disclosure may be deployed either in a centralized or a distributed configuration, and may be either merged into a single module, or further split into a plurality of sub-modules.

These modules may be software (e.g., machine readable instructions stored in a computer readable medium and executable by a processor), hardware (e.g., the processor of an Application Specific Integrated Circuit (ASIC)), or a combination thereof.

According to examples of the present disclosure, the first-level stacking port receiving the packet may be a first-level stacking port on the CB device through which the CB device is connected to the other CB device via the shortest forwarding path. In this case, when there are at least two equivalent forwarding paths between the CB device and the other CB device, the shortest forwarding path may be selected from the at least two equivalent forwarding paths according to a predetermined path-selection rule. According to examples of the present disclosure, the predetermined path-selection rule may include selecting, from at least two equivalent forwarding paths between a source CB device and a destination CB device, a forwarding path with minimum hops as the shortest forwarding path. According to examples of the present disclosure, the at least two equivalent forwarding paths may have the same number of hops. In this case, when a device identifier of the source CB device is smaller than a device identifier of the destination CB device, the packet may be forwarded through a first first-level stacking port. When the device identifier of the source CB device is greater than the device identifier of the destination CB device, the packet may be forwarded through a second first-level stacking port. For example, two first-level stacking ports of a CB device may be denoted as a first-level stacking port 1 and a first-level stacking port 2, respectively. In this case, the first-level stacking port 1 may be configured as the first first-level stacking port and the first-level stacking port 2 may be configured as the second first-level stacking port. Alternatively, the first-level stacking port 2 may be configured as the first first-level stacking port and the first-level stacking port 1 may be configured as the second first-level stacking port. Examples of the present disclosure may not specifically limit herein.

Figure 7A:
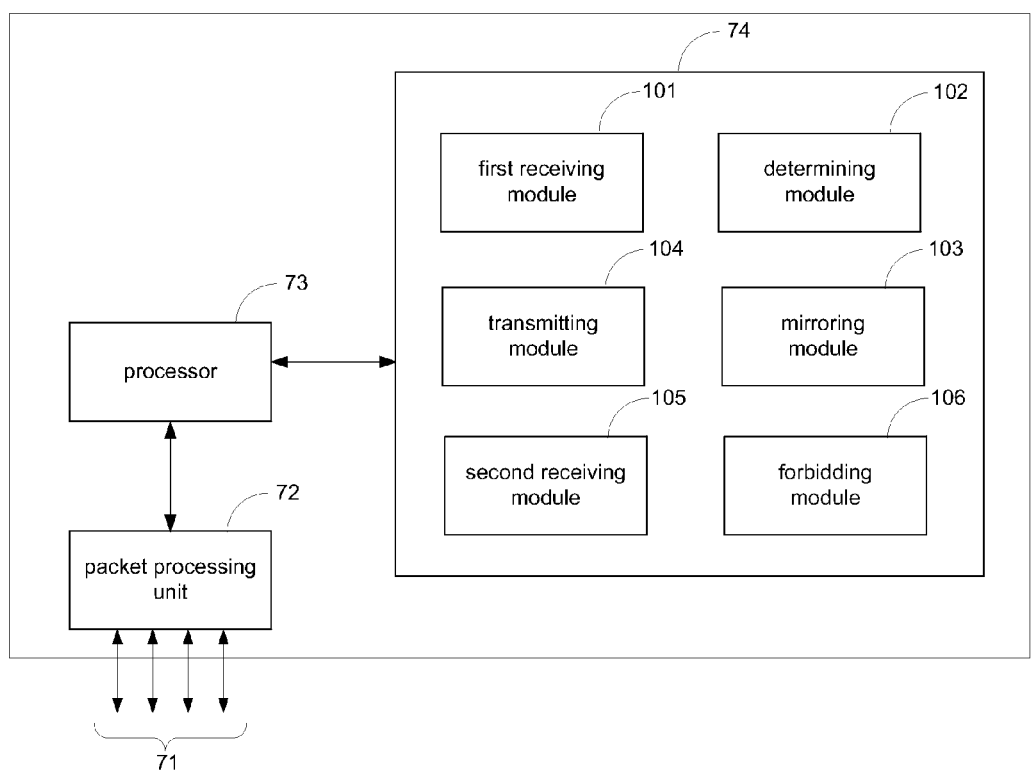
FIG. 7A is a schematic diagram illustrating a hardware structure of a switch module, according to examples of the present disclosure.

FIG. 7A is a schematic diagram illustrating a hardware structure of a switch module in a stacking system, according to examples of the present disclosure. The switch module may be applied to a CB device having a packet buffering module (e.g., a TM chip). As shown in FIG. 7A, the switch module may include ports 71, a packet processing unit 72, a processor 73, and a storage 74. The packet processing unit 72 may transmit packets including data packets and protocol packets received via the ports 71 to the processor 73 for processing, and may transmit data packets and protocol packets from the processor 73 to the ports 71 for forwarding. The storage 74 may store machine-readable instructions. The processor 73 may execute the machine-readable instructions to:

receive a first packet sent from another device through a stacking port; in which the stacking port may include a first-level stacking port connecting the CB device with a neighbor CB device, and a second-level stacking port connecting the CB device with the PE device;

in response to determining, based on source port information carried in the first packet, that the first packet enters the stacking system from the PE device and the first packet is a non-unicast packet, perform mirroring processing to the first packet to obtain a mirrored packet, and transmit the first packet and the mirrored packet to a packet buffering module in the CB device; in which the mirroring processing is associated with the first-level stacking port of the CB device;

receive a second packet sent from the packet buffering module; and in response to determining, based on source port information carried in the second packet, that the second packet enters the stacking system from the PE device and the second packet is the non-unicast packet, forbid forwarding the second packet through the first-level stacking port of the CB device.

According to examples of the present disclosure, the processor 73 may execute the machine-readable instructions to:

in response to determining, based on the source port information carried in the second packet, that the second packet enters the stacking system from the PE device and the second packet is the mirrored packet, forward the second packet through a first-level stacking port associated with the second packet.

According to examples of the present disclosure, the processor 73 may execute the machine-readable instructions to:

when the first packet is received through the second-level stacking port, perform the mirroring processing to the first packet for each first-level stacking port of the CB device;

when the first packet is received through the first-level stacking port, perform the mirroring processing to the first packet for another first-level stacking port of the CB device; and when the first packet is blocked at a stacking link between the neighbor CB device and the CB device connected to the neighbor CB device through the first-level stacking port, forbid performing the mirroring processing to the first packet for the first-level stacking port.

According to examples of the present disclosure, the processor 73 may execute the machine-readable instructions to:

block non-unicast packets that enter the stacking system from different PE devices at different stacking links.

According to examples of the present disclosure, the processor 73 may execute the machine-readable instructions to:

in response to determining, based on the source port information carried in the first packet, that the first packet enters the stacking system from another CB device and the first packet is the non-unicast packet, determine whether the stacking port receiving the first packet is a first-level stacking port on the CB device through which the CB device is connected to the other CB device via a shortest forwarding path;

in response to determining that the stacking port receiving the first packet is the first-level stacking port through which the CB device is connected to the other CB device via the shortest forwarding path, transmit the first packet to the packet buffering module; otherwise, discard the first packet;

in response to determining that the first packet enters the stacking system from the other CB device and the first packet is a unicast packet, transmit the first packet to the packet buffering module; and in response to determining, based on the source port information carried in the second packet, that the second packet enters the stacking system from the other CB device, determine, based on the source port information carried in the second packet, a first-level stacking port on the CB device receiving the second packet, and forbid forwarding the second packet through the determined first-level stacking port.

According to examples of the present disclosure, the first-level stacking port receiving the packet may be a first-level stacking port on the CB device through which the CB device is connected to the other CB device via the shortest forwarding path. In this case, when there are at least two equivalent forwarding paths between the CB device and the other CB device, the shortest forwarding path may be selected from the at least two equivalent forwarding paths according to a predetermined path-selection rule. According to examples of the present disclosure, the predetermined path-selection rule may include selecting, from at least two equivalent forwarding paths between a source CB device and a destination CB device, a forwarding path with minimum hops as the shortest forwarding path. According to examples of the present disclosure, the at least two equivalent forwarding paths may have the same number of hops. In this case, when a device identifier of the source CB device is smaller than a device identifier of the destination CB device, the packet may be forwarded through a first first-level stacking port. When the device identifier of the source CB device is greater than the device identifier of the destination CB device, the packet may be forwarded through a second first-level stacking port.

Figure 7B:
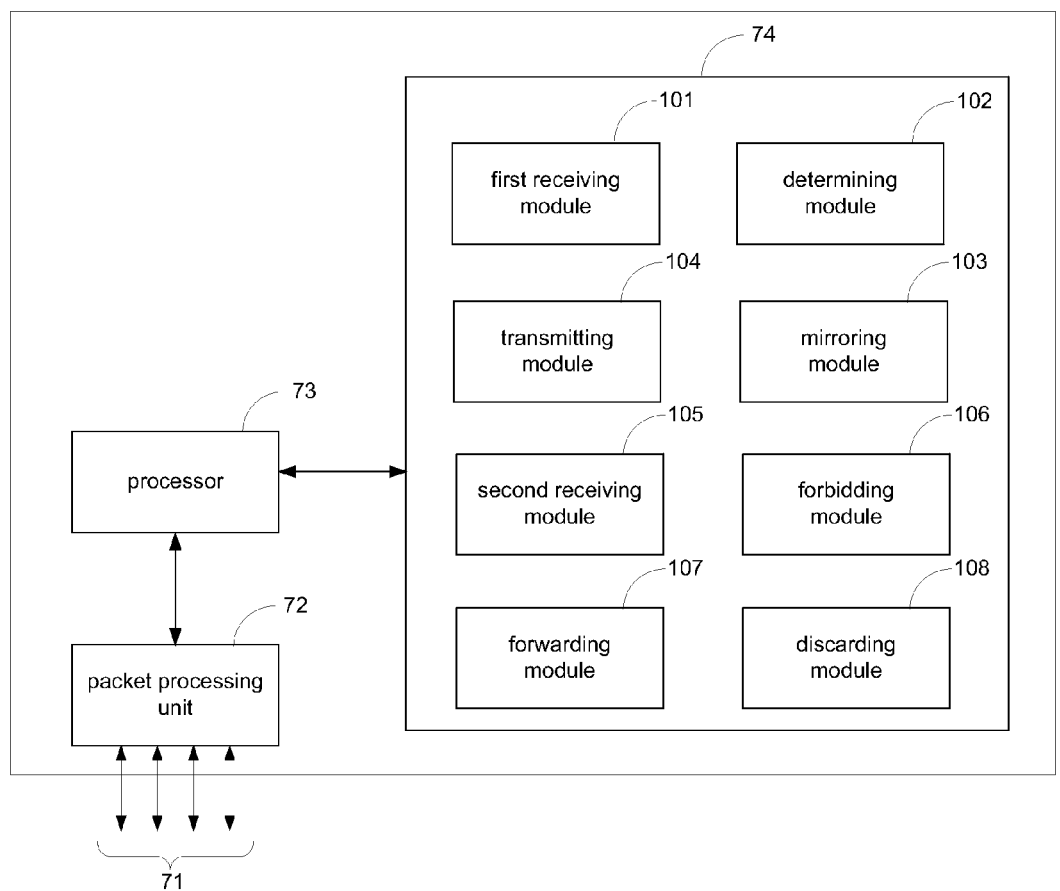
FIG. 7B is a schematic diagram illustrating a hardware structure of a switch module, according to examples of the present disclosure.

As may be seen from the above descriptions, when the machine-readable instructions stored in the storage 74 are executed by the processor 73, functions of the aforementioned first receiving module 101, the determining module 102, the mirroring module 103, the transmitting module 104, the second receiving module 105, the forbidding module 106, the forwarding module 107, and the discarding module 108 may be achieved. Therefore, an example of the hardware structure of the switch module is shown in FIG. 7B.

The above-mentioned modules in the examples of the present disclosure may be deployed either in a centralized or a distributed configuration, and may be either merged into a single module, or further split into a plurality of sub-modules.

As may be seen from the above description, according to various examples of the present disclosure, in a CB-PE stacking network in which a dedicated packet buffering module (e.g., a TM chip) may be used in a CB device, a switch module (e.g., a switch chip) in the CB device may receive a packet through a stacking port. When the switch module determines, based on source port information carried in the packet, that the packet enters the stacking system through a user port of another CB device and in case the packet is a non-unicast packet, the switch module may determine whether a first-level stacking port receiving the packet is a first-level stacking port on the CB device through which the CB device is connected to the other CB device via a shortest forwarding path. In response to determining that the first-level stacking port receiving the packet is the first-level stacking port through which the CB device is connected to the other CB device via the shortest forwarding path, the switch module may transmit the non-unicast packet to the packet buffering module for traffic management, otherwise, the switch module may discard the non-unicast packet. When the switch module determines, based on the source port information carried in the packet, that the packet enters the stacking system through the user port of the other CB device and in case the packet is a unicast packet, the switch module may transmit the unicast packet to the packet buffering module for traffic management. When the switch module receives a packet sent from the packet buffering module and determines, based on source port information carried in the packet, that the packet enters the stacking system through the user port of the other CB device, the switch module may determine a first-level stacking port that receives the packet, and may forbid forwarding the packet through the determined first-level stacking port. As such, for the packet that enters the stacking system through the user port of the other CB device, the switch chip may be controlled not to forward the packet through the first-level stacking port on the CB device receiving the packet, regardless of whether the packet is a unicast packet or a non-unicast packet. In this way, the packet may not be forwarded through an ingress port, and thus a broadcasting loop may be avoided.

According to various examples of the present disclosure, a non-unicast packet entering the stacking system from a PE device may be forwarded within the CB device. The non-unicast packet may not be forwarded through a first-level stacking port of the CB device. In this way, the non-unicast packet entering the stacking system from the PE device may just be forwarded within the CB device itself.

According to various examples of the present disclosure, the CB device may mirror the non-unicast packet entering the stacking system from the PE device to a neighbor CB device for proxy lookup. As such, the non-unicast packet may be forwarded by another CB device, e.g., the neighbor CB device.

According to various examples of the present disclosure, the non-unicast packet entering the stacking system from the PE device may be blocked at a stacking link, so as to avoid a forwarding loop of a mirrored packet. In addition, non-unicast packets that enter the stacking system from different PE devices may be blocked at different stacking links. As such, load balance may be achieved.

The above examples may be implemented by hardware, software or firmware, or a combination thereof. For example, the various methods, processes and functional modules described herein may be implemented by a processor (the term processor is to be interpreted broadly to include a CPU, processing unit, ASIC, logic unit, or programmable gate array, etc.). The processes, methods, and functional modules disclosed herein may all be performed by a single processor or split between several processors. In addition, reference in this disclosure or the claims to a 'processor' should thus be interpreted to mean 'one or more processors'. The processes, methods and functional modules disclosed herein may be implemented as machine readable instructions executable by one or more processors, hardware logic circuitry of the one or more processors or a combination thereof. Further the examples disclosed herein may be implemented in the form of a computer software product. The computer software product may be stored in a non-transitory storage medium and may include a plurality of instructions for making a computer apparatus (which may be a personal computer, a server or a network apparatus such as a router, switch, access point, etc.) implement the method recited in the examples of the present disclosure.

All or part of the procedures of the methods of the above examples may be implemented by hardware modules following machine readable instructions. The machine readable instructions may be stored in a computer readable storage medium. When running, the machine readable instructions may provide the procedures of the method examples. The storage medium may be diskette, CD, ROM (Read-Only Memory) or RAM (Random Access Memory), and etc.

The figures are only illustrations of examples, in which the modules or procedures shown in the figures may not be necessarily essential for implementing the present disclosure. The modules in the aforesaid examples may be combined into one module or further divided into a plurality of sub-modules.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for forwarding a packet in a stacking system, wherein the stacking system comprises a core backbone (CB) device and a port extender (PE) device connected to the CB device, the method comprising:
  receiving, by a switch module of the CB device, a first packet sent from another device through a stacking port;
    wherein the stacking port is a first-level stacking port connecting the CB device with a neighbor CB device, or a second-level stacking port connecting the CB device with the PE device;
  in response to determining, based on source port information carried in the first packet, that the first packet enters the stacking system from the PE device and the first packet is a non-unicast packet, performing mirroring processing to the first packet to obtain a mirrored packet, and transmitting the first packet and the mirrored packet to a packet buffering module of the CB device;
    wherein the mirroring processing is associated with the first-level stacking port of the CB device;
  receiving a second packet sent from the packet buffering module; and
  in response to determining, based on source port information carried in the second packet a port at which the second packet entered the CB device, the port indicating that the second packet entered the stacking system from the PE device and the second packet is the first packet, forbidding forwarding of the second packet through all first-level stacking ports of the CB device.

2. The method of claim 1, further comprising:
  in response to determining, based on the source port information carried in the second packet, the port at which the second packet entered the CB device, the port indicating that the second packet enters the stacking system from the PE device and the second packet is the mirrored packet, forwarding the second packet through another first-level stacking port associated with the second packet.

3. The method of claim 1, wherein the operation of performing the mirroring processing to the first packet comprises:
  when the first packet is received through the second-level stacking port, performing the mirroring processing to the first packet for each first-level stackingport of the CB device;
  when the first packet is received through the first-level stacking port, performing the mirroring processing to the first packet for another first-level stacking port of the CB device; and
  when the first packet is blocked at a stacking link between the neighbor CB device and the CB device connected to the neighbor CB device through the first-level stacking port, forbidding performing the mirroring processing to the first packet for the first-level stacking port.

4. The method of claim 3, further comprising:
  blocking non-unicast packets that enter the stacking system from different PE devices at different stacking links.

5. The method of claim 1, further comprising:
  in response to determining, based on the source port information carried in the first packet, that the first packet enters the stacking system from another CB device and the first packet is the non-unicast packet, determining whether the stacking port receiving the first packet is the first-level stacking port on the CB device through which the CB device is connected to the other CB device via a shortest forwarding path;
  in response to determining that the stacking port receiving the first packet is the first-level stacking port through which the CB device is connected to the other CB device via the shortest forwarding path, transmitting the first packet to the packet buffering module; otherwise, discarding the first packet;
  in response to determining that the first packet enters the stacking system from the other CB device and the first packet is a unicast packet, transmitting the first packet to the packet buffering module; and
  in response to determining, based on the source port information carried in the second packet, that the second packet enters the stacking system from the other CB device, determining, based on the source port information carried in the second packet, the first-level stacking port on the CB device receiving the second packet, and forbidding forwarding the second packet through the determined first-level stacking port.

6. The method of claim 5, wherein when there are at least two equivalent forwarding paths between the CB device and the other CB device, the shortest forwarding path is selected from the at least two equivalent forwarding paths according to a predetermined path-selection rule;
  wherein the predetermined path-selection rule comprises:
  selecting, from the at least two equivalent forwarding paths, a forwarding path with minimum hops as the shortest forwarding path.

7. A device capable of acting as a core backbone (CB) device in a stacking system, the device comprising:
  a storage, to store machine-readable instructions;
  a processor, to execute the machine-readable instructions to:
    receive a first packet sent from another device through a stacking port;
      wherein the stacking port is a first-level stacking port to connect the CB device with a neighbor CB device, or a second-level stacking port to connect the CB device with a Port Extender (PE) device;
    in response to determining, based on source port information carried in the first packet, that the first packet entered the stacking system through the PE device and the first packet is a non-unicast packet, perform mirroring processing to the first packet to obtain a mirrored packet, and transmit the first packet and the mirrored packet to the CB device, wherein the mirroring processing is associated with the first-level stacking port of the CB device;
    receive a second packet sent from the CB device; and
    in response to determining, based on source port information carried in the second packet, a port at which the second packet entered the CB devices, the port indicating that the second packet entered the stacking system from the PE device and the second packet is the first packet, forbid forwarding the second packet through all first-level stacking ports of the CB device.

8. The device of claim 7, wherein the processor is to execute the machine-readable instructions to:
  in response to determining, based on the source port information carried in the second packet, that the second packet entered the stacking system through the PE device and the second packet is the mirrored packet, forward the second packet through another first-level stacking port associated with the second packet.

9. The device of claim 7, wherein the processor is to execute the machine-readable instructions to:
  when the first packet is received through the second-level stackingport, perform the mirroring processing to the first packet for each first-level stacking port of the CB device;
  when the first packet is received through the first-level stackingport, perform the mirroring processing to the first packet for another first-level stacking port of the CB device; and
  when the first packet is blocked at a stacking link between the neighbor CB device and the CB device connected to the neighbor CB device through the first-level stacking port, forbid performing the mirroring processing to the first packet for the first-level stacking port.

10. The device of claim 9, wherein the processor is to execute the machine-readable instructions to:
  block non-unicast packets that enter the stacking system from different PE devices at different stacking links.

11. The device of claim 7, wherein the processor is to execute the machine-readable instructions to:
  in response to determining, based on the source port information carried in the first packet, that the first packet enters the stacking system from another CB device and the first packet is the non-unicast packet, determine whether the stacking port receiving the first packet is the first-level stacking port on the CB device through which the CB device is connected to the other CB device via a shortest forwarding path;
  in response to determining that the stacking port receiving the first packet is the first-level stacking port through which the CB device is connected to the other CB device via the shortest forwarding path, transmit the first packet; otherwise, discard the first packet;
  in response to determining that the first packet enters the stacking system from the other CB device and the first packet is a unicast packet, transmit the first packet; and
  in response to determining, based on the source port information carried in the second packet, that the second packet entered the stacking system from the other CB device, determine, based on the source port information carried in the second packet, another first-level stacking port on the CB device receiving the second packet, and forbid forwarding the second packet through the determined first-level stacking port.

12. The device of claim 11, wherein when there are at least two equivalent forwarding paths between the CB device and the other CB device, the shortest forwarding path is selected from the at least two equivalent forwarding paths according to a predetermined path-selection rule;
  wherein the predetermined path-selection rule comprises:
    selecting, from the at least two equivalent forwarding paths, a forwarding path with minimum hops as the shortest forwarding path.

* * * * *